INVENTORS:
Donald H. Jacobs

April 12, 1955 D. H. JACOBS ET AL 2,706,247
MEANS AND METHOD FOR STORING INFORMATION IN DIGITAL COMPUTERS
Filed Oct. 14, 1949 2 Sheets-Sheet 2

INVENTORS:
Donald H. Jacobs
Michael May

United States Patent Office 2,706,247

Patented Apr. 12, 1955

2,706,247

MEANS AND METHOD FOR STORING INFORMATION IN DIGITAL COMPUTERS

Donald H. Jacobs, Wood Acres, and Michael May, Ashton, Md.; said May assignor to said Jacobs Application October 14, 1949, Serial No. 121,332

2 Claims. (Cl. 250—27)

In electrical or electronic digital computers, it is necessary to provide means for storing information. Data can be stored in various ways such as by the use of bi-stable circuits, secondary emission phenomena, mercury delay lines, etc. In most of the methods of storing information which are in common use, storage devices which have two conditions of operation are employed. The storage device is operated in one condition if a certain digit is to be stored; it is operated in the other condition if the digit is not present. Hence any time it is desired to determine which digits are present, it is possible to sense the state of each successive storage element. For example, the fact that an Eccles-Jordan circuit is in one of its two possible states can be taken to indicate the presence of a digit; the fact that it is in the other state can indicate the absence of this digit. Hence with $n$ such circuits, the presence or absence of $n$ digits can be indicated.

The methods of storing information which are currently known to the art are all relatively uneconomical with regard to volume and weight.

The present invention consists of circuits for use as storage devices which are economical with regard to space and weight. The circuits that will be described are each capable of storing a single digit. It will be understood that as many such circuits as may be desired can be employed in a single computer, one being required for each digit to be stored at a given point in the computing device.

The essence of the present invention is the use of a single electronic tube or crystal triode as a device with two stable states. One of these states indicates the presence of a digit; the other indicates its absence. One embodiment of the present invention involves utilizing the tube or crystal triode as an oscillator. Hence one of the two stable states is an oscillation of the tube; the other stable state is that of quiesence. The tube can be changed from either state (oscillating or non-oscillating) to the opposite state by the application of a signal (such as a pulse, for example) to an appropriate point in the circuit. No oscillator circuit in existence prior to this invention had this property; hence no prior oscillating circuit could be used as a bi-stable device. Another embodiment of the invention involves the use of the tube or crystal triode as an electronic switch. Hence one stable state involves the use of the tube or crystal triode in one current-conducting state; the other stable state involves the use of the tube or crystal-triode in another conducting state. The two states differ in the amount of current conducted by the tube. In a special case one of the conducting states can be the state of conducting zero, or essentially zero, current.

The invention will be described by referring to the accompanying diagrams in which are shown various embodiments:

Figure 1:
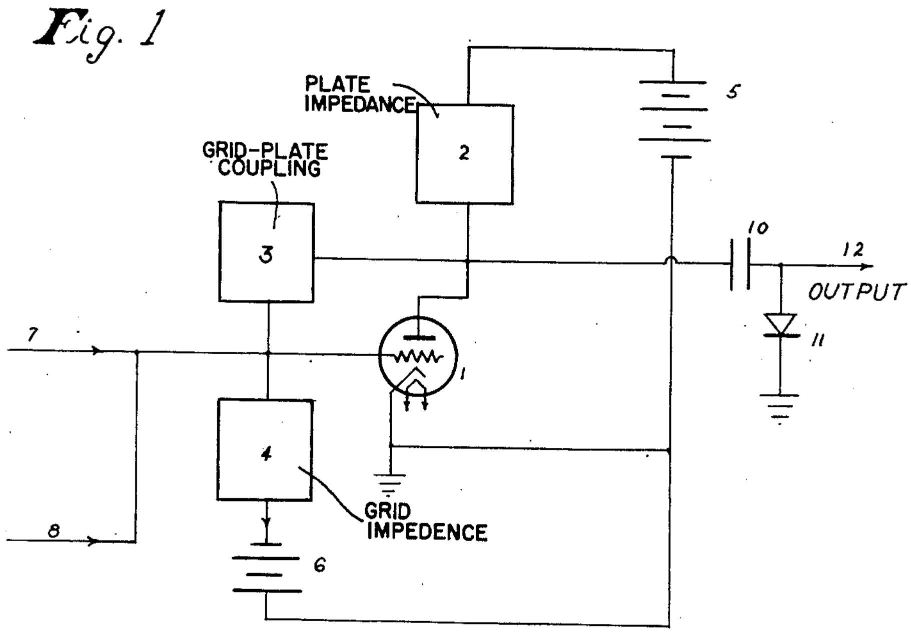
Fig. 1 shows one embodiment of the invention comprising a vacuum tube oscillator having stable oscillating and quiescent states.

Fig. 1 shows an oscillator in diagrammatic form. The electronic tube 1 has in its anode circuit an impedance 2. Anode power is provided by the battery 5. The impedance 3 is of such a nature that the feed-back from the anode to the grid will cause the tube to oscillate. The impedance 3 includes the use of mutual inductance and is not limited to physical components. The impedance 4 isolates the grid of the tube from the bias battery 6. The battery 6 is of such a potential that the tube cannot conduct or start to oscillate of its own accord when in the quiescent state. A practical example of one form of oscillator circuit that is represented by Fig. 1 is the tuned-plate tuned-grid type of oscillator. In this type of circuit, impedance 2 would comprise an inductor and a capacitor connected in parallel. The impedance 3 would comprise a coupling capacitor, or alternatively would comprise the inherent grid-to-plate capacity of the triode vacuum tube. The impedance 4 would comprise an inductor and capacitor in parallel. Conventional oscillator circuits are all represented in Fig. 1, which also shows the invention. This invention comprises biassing these well-known oscillator circuits by means of the battery 6 or by any other well-known means such as the application of cathode bias. When thus biassed a signal on line 7 can be made to cause the tube 1 to start oscillating. Because of the nature of the impedances 2, 3, and 4 either together, or separately, the tube will continue to oscillate until it is intentionally stopped by a signal on line 8. The anode of the tube is connected via condenser 10 to rectifier 11. It will be seen that when the circuit is oscillating there will be a rectified voltage on line 12. When the circuit is not oscillating the output on line 12 will be substantially zero.

A signal on line 8 can cause the tube to stop oscillating, for example by biasing the oscillator tube grid negative until oscillations cease. In this embodiment of the invention, the invention comprises the combination of biassing means 6 and a conventional oscillator circuit, the biassing means 6 giving to the conventional oscillator circuit the ability to be started into oscillation or stopped from oscillating by the application of electrical signals, no mechanical circuit changes (switches, etc.) being required to perform these operations. Hence the invention is a new type of oscillator having the required, and hitherto unattainable, bi-stable properties.

One method of using the bi-stable circuit of Fig. 1 is to apply a positive pulse to the input 7 when it is required to store the presence of a digit. The oscillator will then continue to oscillate and provide an output voltage on line 12. When a negative pulse is applied to the input it will cause the circuit to be returned to its quiescent state. There are many other methods well known to the art for starting and stopping the oscillations. For example temporary removal of the anode potential to the oscillator vacuum tube will cause it to cease oscillating.

Figure 2:
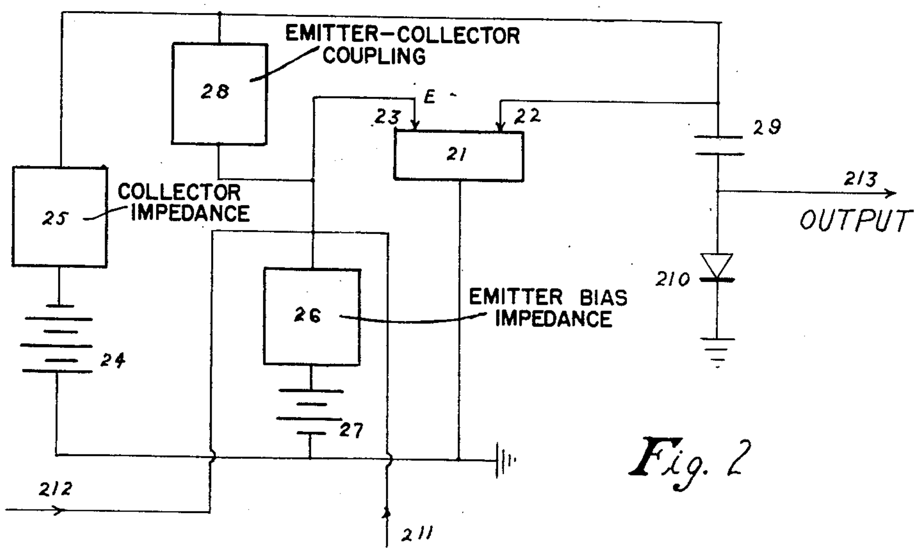
Fig. 2 is a variation of Fig. 1 utilizing a transistor in place of a vacuum tube.

Fig. 2 shows a similar circuit using a transistor or crystal triode. The germanium block 21 is connected to ground. The collector 22 is connected to a negative battery supply 24 through impedance 25. The emitter 23 is connected through an impedance 26 to a battery supply 27. A suitable impedance 28 provides coupling between the collector and emitter. In one embodiment of the invention the impedances 25 and 26 are tuned circuits, each comprising a capacitor and an inductor. In this embodiment impedance 28 would be a capacitor. Another similar embodiment employing both capacitors and inductors for each of the impedances 25 and 26 would use mutual inductive coupling between the said inductances. This mutual inductance is represented in Fig. 2 by block 28. In another embodiment it would also be effective to place impedance 28 between point 21 and ground. The output of the oscillator is taken through condenser 29 to rectifier 210. When the circuit is oscillating there will be a voltage on the output line 213. When the circuit ceases to oscillate the output voltage on line 213 will be substantially zero. For the purposes of this application, a transistor will be viewed as a vacuum tube (as is often done in conventional engineering work), and the term "vacuum tube" will be understood as referring to a transistor as well as to a vacuum tube.

The voltage applied to the emitter by battery 27 is so adjusted that the circuit will remain in a quiescent state, unless disturbed by a control signal. However if a positive pulse or C. W. signal is applied to line 212 it will enable the transistor to conduct sufficiently to enable oscillations to build up. After removal of the signal the circuit will continue to oscillate.

To stop the circuit oscillating a negative pulse may be applied on line 211, thus biassing the transistor so that oscillations cease.

Figure 3:
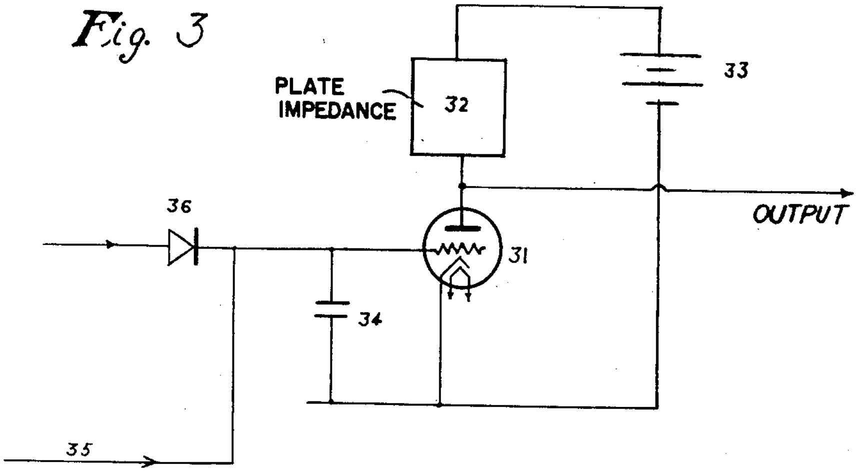
Fig. 3 is another embodiment of the invention utilizing a vacuum tube amplifier to indicate the presence of a charge on a condenser.

Fig. 3 shows a variation of this method of storing information. The electronic tube 31 has its anode connected through an impedance 32 to battery 33. The anode of the tube 31 provides the output voltage. The grid of tube 31 is taken to the cathode through condenser 34. A positive pulse applied through rectifier 36 will charge the condenser and cause tube 31 to conduct. While a positive charge remains on the condenser, the output voltage from the tube's anode will be low. A negative pulse applied to the grid via input 35 can cause the condenser 34 to be discharged and cut off the tube 31, thereby causing the output voltage to be high. This circuit can be considered to be bi-stable over a period of time shorter than that which it takes condenser 34 to discharge through various unavoidable leakage paths. The above description is just one means of achieving the desired result. Other useful combinations include the use of a cathode follower in which case the impedance 32 of Fig. 3 would be situated in the cathode instead of the plate of tube 31, and the output would be taken from the cathode.

Also in Fig. 3 a load could be provided in both the plate and cathode of tube 31 making possible two outputs of opposite phase. Also a pentode or other multigrid electronic tube could be used in place of the triode 31 in Fig. 3. Another method of using the storage device of Fig. 3 is by considering the normal state to be that when the charge on condenser 34 had been reduced to near zero. Under these conditions the anode current of the vacuum tube triode would be relatively high and the anode potential correspondingly low. When it was required to indicate the presence of a digit in said storage device a negative potential would be applied to the condenser 34 which would then hold the grid of the vacuum tube 31 negative. Under these conditions the anode current of the vacuum tube would be low or zero and the anode potential correspondingly high.

Figure 4:
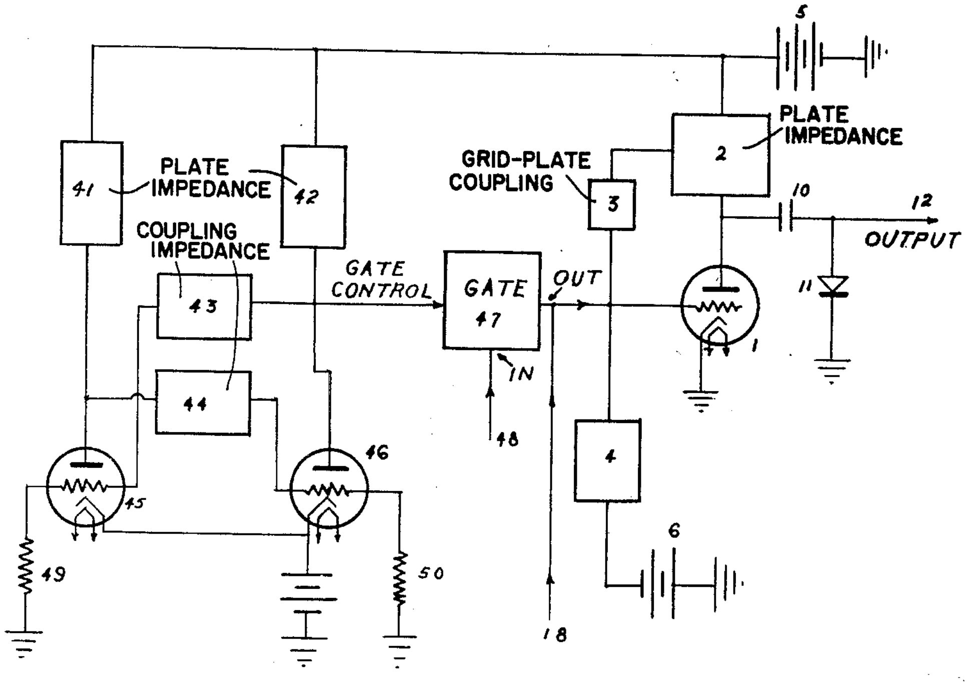
Fig. 4 shows one way in which the invention might be connected to one of many bi-stable circuits in a computing register.

Fig. 4 shows how the circuit of Fig. 1 can be used to store a single digit in an electronic digital computer register.

The electronic tubes 49 and 46 together with impedances 41, 42, 43, and 44 make up the essential elements of a bi-stable circuit. It is desired to indicate the fact whether tube 46 was conducting or not. Accordingly tube 46 opens the electronic gate 47 when it is conducting and closes the electronic gate 47 when it is not conducting. When it is required to record the state of tube 46 a positive pulse is fed in through input 48. If tube 46 was conducting the gate 47 would be open and the positive pulse would be passed through gate 47 to the grid of tube 1. Now tube 1 together with impedances 2, 3, and 4, batteries 5 and 6, condenser 10 and rectifier 11 make up the circuit of Fig. 1. A positive pulse on the grid of tube 1 therefore causes it to start oscillating and maintain its oscillating condition. This causes a voltage to appear at output 12. If however tube 46 were not conducting a positive pulse fed in input 48 would not pass through the gate. Therefore tube 1 would not be started oscillating and the output on line 12 would be essentially zero.

When it is required to stop tube 1 oscillating, a negative pulse is applied to its grid via line 18. This returns the stage to its quiescent state ready to indicate the state of tube 46 again. Fig. 4 is an example of how the information on a single bi-stable circuit can be stored. Actually a large number of such circuits will normally be required to make up a storage register in an electronic digital computer.

The advantage of the invention is the use of a single electronic tube as a bi-stable device for storing information in an electronic digital computer. The circuits of Figs. 1, 2, 3, and 4 inclusive are only examples of ways in which the invention may be applied. The invention relates to the use of all oscillators, which are biased so they cannot start to oscillate without a control signal and which are used for the purpose of storing information in an electronic digital computer. It also relates to a like device in which a condenser and electronic tube are the essential components such as the circuit of Fig. 3, when used for the purpose of storing information in an electronic computer. This may be considered as a simplified version of the oscillator storage circuit.

Whereas Figs. 1, 2, and 4 show a rectifier in the oscillator outputs, the use of a rectifier to provide a D.-C. output for indication or control purposes represents only one form of the output arrangement that may be used with the invention. Several other output circuits may be used which are within the scope of the invention. For example variations between the active and quiescent states of the oscillator can be arranged to vary the grid to cathode or cathode to ground potentials of the oscillating tube. These potential changes could be used for indication or control purposes. The oscillating potential at any convenient oscillator tube electrode could also be used for indication or control when the oscillator is in an active state.

Having thus described our invention, what we claim as new and desire to secure by Letters Patent is:

1. Means for storing information in an electrical or electronic digital computer regarding the state of a bi-stable circuit comprising, a biased oscillator and an electronic gate connected to and controlled by a bi-stable circuit, means for applying a signal through said electronic gate to actuate said biased oscillator when said bi-stable circuit is in one particular state, and means for inhibiting said signal from actuating said biased oscillator when said bi-stable circuit is in the other particular state.

2. In combination, a bi-stable device for indicating the presence or absence of a digit in an electrical or electronic digital computer, an electronic gate having a conductive condition and a non-conductive condition connected to and controlled by said bi-stable device, means for applying an actuating signal to said gate, an oscillator circuit biased to quiescent condition, and means connecting said gate to said oscillator circuit for carrying said signal thereto and shifting said circuit to oscillating condition in accordance with the indication of said bi-stable device.

UNITED STATES PATENTS

References Cited in the file of this patent

| | | |
|---|---|---|
| 1,552,321 | Lea | Sept. 1, 1925 |
| 2,060,095 | Mathes | Nov. 10, 1936 |
| 2,153,158 | Roosenstein | Apr. 4, 1939 |
| 2,255,839 | Wilson | Sept. 16, 1941 |
| 2,275,016 | Koch | Mar. 3, 1942 |
| 2,325,927 | Wilbur | Aug. 3, 1943 |
| 2,404,919 | Overbeck | July 30, 1946 |
| 2,405,237 | Ruhlig | Aug. 6, 1946 |
| 2,416,368 | Young, Jr. | Feb. 25, 1947 |
| 2,454,845 | Sherman et al. | Nov. 30, 1948 |
| 2,462,078 | Earp | Feb. 22, 1949 |
| 2,486,776 | Barney | Nov. 1, 1949 |
| 2,521,376 | Keith-Murray | Sept. 5, 1950 |
| 2,524,035 | Bardeen | Oct. 3, 1950 |
| 2,533,001 | Eberhard | Dec. 5, 1950 |
| 2,534,233 | Cleeton | Dec. 19, 1950 |
| 2,540,923 | Williams | Feb. 6, 1951 |

OTHER REFERENCES

"Single-Valve Time-Base Circuit," by Fleming-Williams, Wireless Engineer, April 1940, pages 161–163.

"A Transistor Trigger Circuit," by Reich et al., Review of Scientific Instruments, vol. 20, No. 8, August 1949, pages 586–588.